United States Patent [19]

Faulk

[11] Patent Number: 5,136,231
[45] Date of Patent: Aug. 4, 1992

[54] NI-CAD BATTERY CHARGE RATE CONTROLLER

[75] Inventor: Richard A. Faulk, Cypress, Tex.

[73] Assignee: Compaq Computer Corporation, Houston, Tex.

[21] Appl. No.: 596,223

[22] Filed: Oct. 12, 1990

[51] Int. Cl.[5] .............................................. H02J 7/00
[52] U.S. Cl. ..................................... 320/31; 320/35; 320/36; 320/39; 320/40
[58] Field of Search ..................... 320/31, 35, 36, 39, 320/40

[56] References Cited

U.S. PATENT DOCUMENTS

| | | | |
|---|---|---|---|
| 3,652,915 | 3/1972 | Eberts | 320/31 |
| 4,006,397 | 2/1977 | Catotti et al. | 320/31 |
| 4,061,956 | 12/1977 | Brown et al. | 320/39 |
| 4,209,736 | 6/1980 | Reidenbach | 320/35 |
| 4,371,826 | 2/1983 | Shelly | 320/40 |
| 4,392,101 | 7/1983 | Saar et al. | 320/39 |
| 4,433,277 | 2/1984 | Carallo et al. | 320/36 |
| 4,670,703 | 6/1987 | Williams | 320/31 |
| 4,709,202 | 11/1987 | Koenck et al. | 320/43 |
| 4,820,965 | 4/1989 | Siemer | 320/31 |
| 4,843,299 | 6/1989 | Hutchings | 320/31 |
| 4,961,043 | 10/1990 | Koenck | 320/21 |

FOREIGN PATENT DOCUMENTS

| | | | |
|---|---|---|---|
| 3901096 | 8/1989 | Fed. Rep. of Germany | 320/40 |
| 0316643 | 12/1988 | Japan | 320/35 |
| 0616688 | 7/1978 | U.S.S.R. | 320/39 |
| 1190429 | 11/1985 | U.S.S.R. | 320/39 |

OTHER PUBLICATIONS

Compaq Computer Corporation, Dual Battery Charger Schematic, May 19, 1989, pp. 1-4.

Primary Examiner—Steven L. Stephan
Assistant Examiner—Thomas M. Dougherty
Attorney, Agent, or Firm—Pravel, Gambrell, Hewitt, Kimball & Krieger

[57] ABSTRACT

A current limiter placed in the charge path of a battery limits the charge rate that a battery charger can provide to the battery. The battery temperature, voltage, and current are monitored to determine whether the battery can handle a faster rate of charge than the current limiter allows. If the battery can handle a higher rate of charge, a transistor configured in parallel with the current limiter is enabled which by-passes the current limiter and allows the battery charger to charge the battery at a higher rate.

36 Claims, 3 Drawing Sheets

NI-CAD BATTERY CHARGE RATE CONTROLLER

BACKGROUND OF THE INVENTION

1. Field of the Invention

The present invention relates to a method of controlling the charge rate of a nickel-cadmium (Ni-Cad) battery charger installed in a computer system.

2. Description of the Related Art

Some computer systems use a Ni-Cad battery to provide the power to the computer when an alternating current (ac) outlet is inconvenient or unavailable. The Ni-Cad battery is eventually drained and an ac power source is necessary to run the computer and/or recharge the Ni-Cad battery. The computer uses a Ni-Cad battery charger which controls the energy supplied during charging of the Ni-Cad battery.

Many techniques are available to charge Ni-Cad batteries. The quickest method is to charge the battery at a very high rate until it is fully charged and then to switch into a very slow rate, or trickle rate, to maintain that charge. The rate of charge depends upon the amount of current forced through the battery. A fast charge uses a high amount of current and a slow charge uses a relatively low amount of current. A Ni-Cad battery used in computers conventionally contains one or more individual Ni-Cad cells. The amount of current used to determine the charge rate depends upon the number of cells in the battery, the state of the cells in the battery, the power rating of each cell and other characteristics of the particular cells.

Ni-Cad batteries require special handling and control during fast charging to prevent overheating and damage. The battery charge controller must contain adequate monitoring devices and circuitry to charge the Ni-Cad battery at different rates, to detect the status of parameters such as voltage and temperature of the battery, especially at higher rates of charge, and to switch from one charge rate to another. Additionally, if the Ni-Cad battery is deeply discharged, if a fast charge is supplied, the battery may draw too much energy and interfere with computer operation by drawing down the voltage. The battery charge control circuitry must also compensate for this condition. Battery chargers may, therefore, require complex circuitry as well as expensive components to achieve these tasks.

SUMMARY OF THE INVENTION

The present invention provides control over the charge rate of a Ni-Cad battery by switching a current limiter in or out of the charging circuit depending upon the status of the Ni-Cad. A simple current limiter utilizing a common discrete component limits the current of a Ni-Cad charger to the required trickle rate for slow charge. FET power transistors are configured as a switch such that when they are turned on they simultaneously by-pass and disable the current limiter and allow the Ni-Cad battery to charge at a fast rate. A current sense resistor is connected between the current limiter and ground to allow monitoring of the charge current. The drain and source voltages of the FET power transistors corresponding to the charge current, as well as the temperature and voltage of the Ni-Cad battery, are monitored to determine the battery status. The gate voltage of the FET transistors is controlled to switch the current limiter in or out depending upon the battery status. The limiter is switched in when the conditions indicate trickle or slow charge is proper and switched out when a fast charge or discharge is appropriate.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE INVENTION

Figure 1:
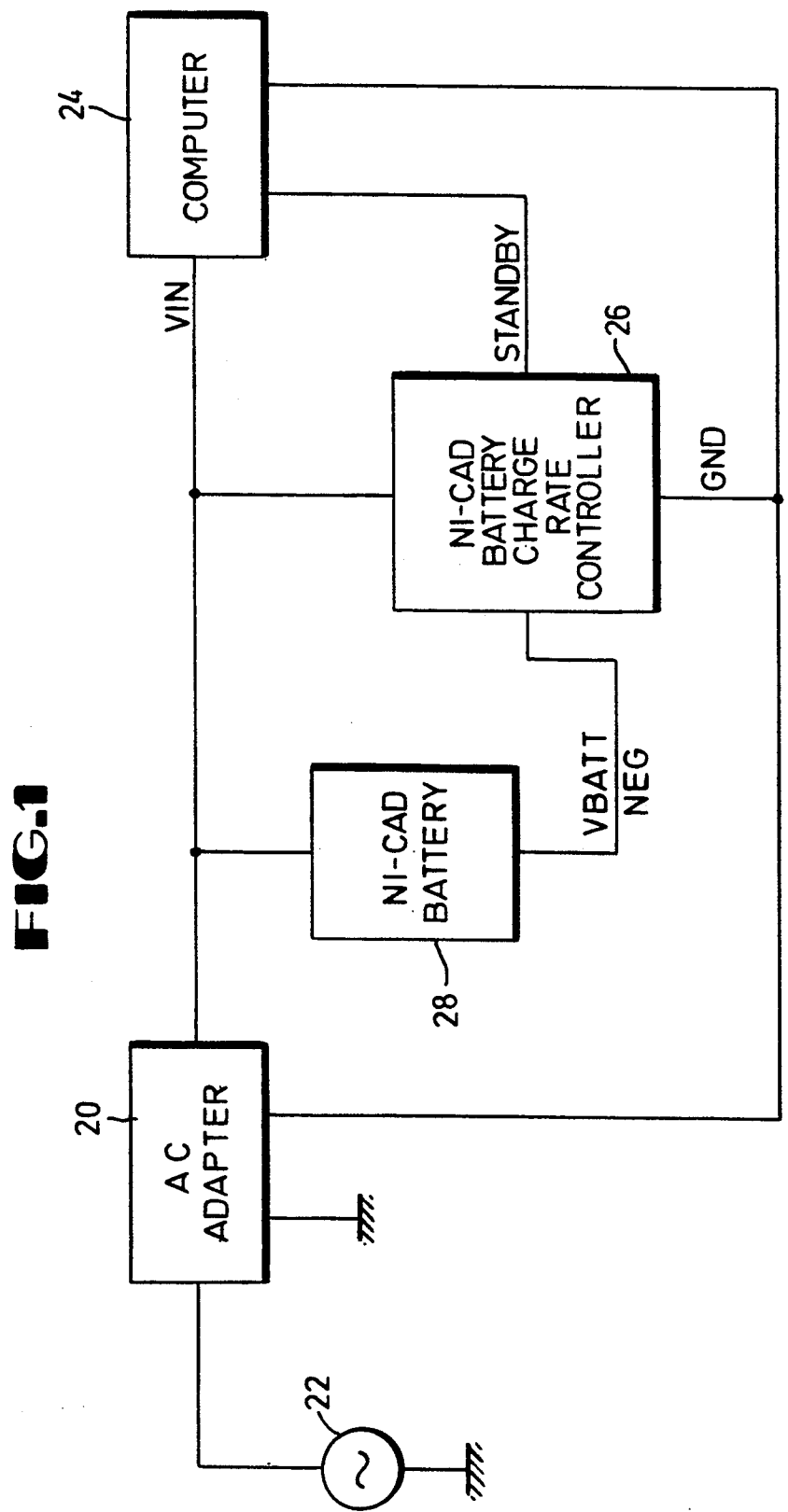
FIG. 1 is a block diagram of a computer system utilizing Ni-Cad batteries and a battery charge rate controller according to the present invention.

FIG. 1 shows a block diagram of a computer system using a Ni-Cad battery 28 and a Ni-Cad battery charge rate controller 26. An ac adaptor 20 is connected to an ac power source 22. The ac adaptor 20 converts the ac voltage to dc voltage which is used to power the computer 24. The positive supply output is referred to as VIN, while the negative supply is considered ground. The ac adaptor 20 is either output current or output power limited to prevent possible overcurrent in the Ni-Cad battery 28 during fast charge mode. The current or power limits are set as appropriate for the particular cells forming the Ni-Cad battery 28. The ac adapter 20 also supplies power to the Ni-Cad battery charge rate controller 26, which is connected between the positive supply VIN and ground. The Ni-Cad battery 28 has its positive terminal connected to the positive supply VIN and its negative terminal connected to the Ni-Cad battery charge rate controller 26 as shown by the VBATT-NEG signal.

The Ni-Cad battery charge rate controller 26 controls the rate of charging of the Ni-Cad battery 28, either fast charge or trickle charge, when the ac adaptor 20 is active and allows the Ni-Cad battery 28 to power the computer 24 when the ac adaptor 20 is not active. Additionally, the Ni-Cad battery charge rate controller 26 receives a signal referred to as STANDBY from the computer 24. The computer 24 provides this signal when the computer 24 is entering or is in very low power state and is used to conserve energy and extend battery life. The STANDBY signal is used by the Ni-Cad battery charge rate controller 26 to reduce the controller's own power consumption, thus allowing even greater energy savings. Preferably the Ni-Cad battery charge rate controller 26 and the Ni-Cad battery 28 are combined in a single physical unit for reasons to be explained later.

Figure 2:
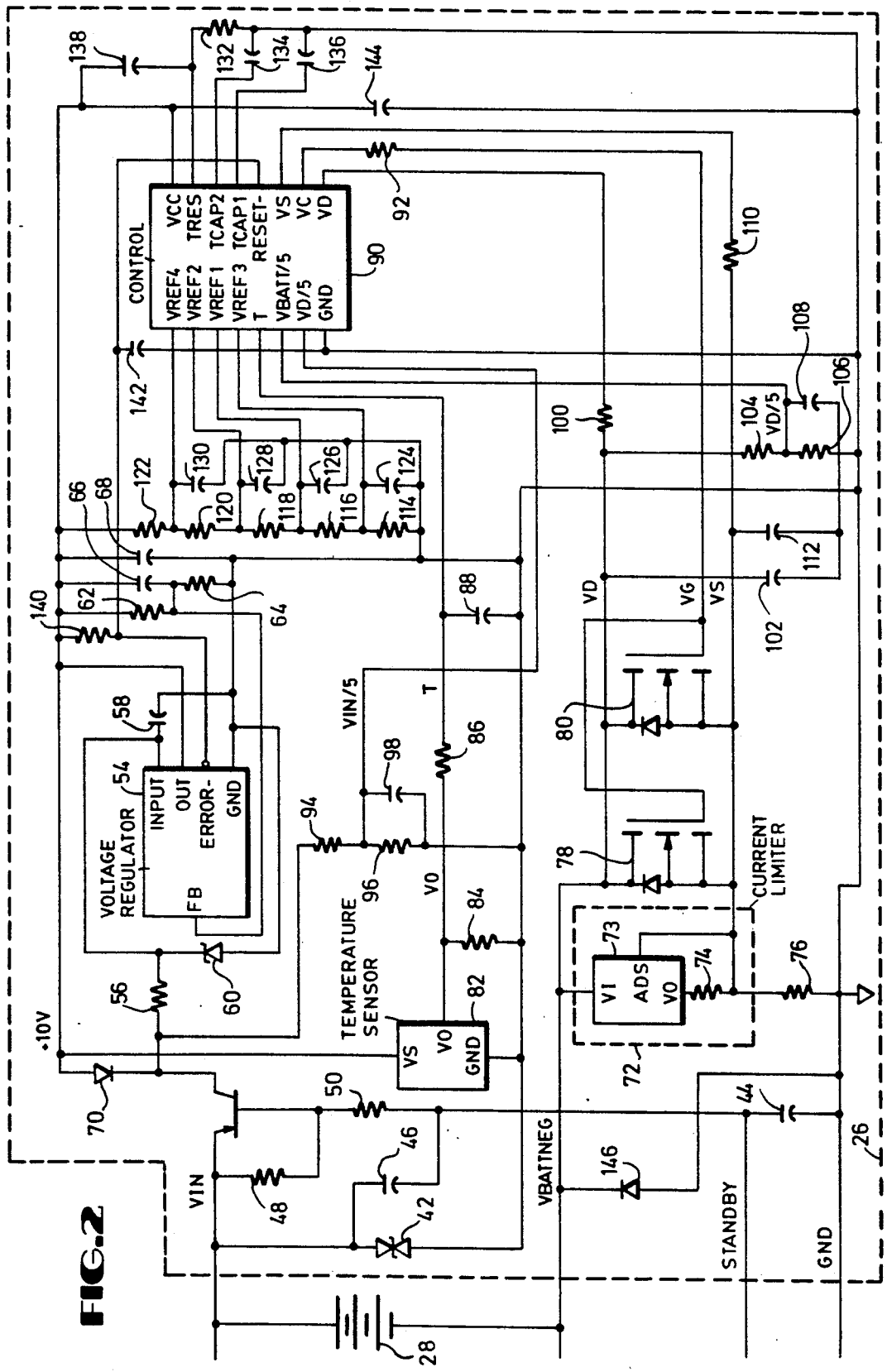
FIG. 2 is a schematic diagram of a circuit implementation of the Ni-Cad battery charge rate controller of FIG. 1.

FIG. 2 is a more detailed schematic showing the Ni-Cad battery 28 connected to the Ni-Cad battery charge rate controller 26. A transorb 42, connected between VIN and ground, is an electrostatic detection device which protects the Ni-Cad battery charge rate controller 26 circuitry from voltage transients and electrostatic discharges. A PNP pass transistor 52 has its emitter connected to the VIN signal and is used to disable the circuitry of the Ni-Cad battery charge rate controller 26 during low power consumption or standby periods. A resistor 48 is provided from the emitter to the base of the transistor 52, with a second resistor 50 connected between the base and the STANDBY signal input. A capacitor 46 is connected between the VIN signal and the STANDBY signal for electrostatic discharge purposes. A capacitor 44 is connected between the STANDBY signal input and ground. When the STANDBY signal is held at a low level by the computer 24, indicating full power operational status, the transistor 52 is active and passes the VIN signal to the controller, thus passing the supply voltage to the remaining circuitry. If the STANDBY signal is raised to a high level, or preferably simply not driven, as would occur when the Ni-Cad battery 28 and controller 26 are removed from computer 24, the capacitor 44 charges and the transistor 52 eventually shuts off. This stops current flow through the transistor 52, disabling the remaining circuitry. This disabled condition thus reduces battery drain, either when the computer 24 is in STANDBY or the battery 28 is removed.

If the STANDBY signal is low, dc power from the ac adaptor 20 provides power to the input of a micropower voltage regulator 54, such as an LP2951 from National Semiconductor, through a resistor 56. The resistor 56 limits input current. A capacitor 58 is connected between the input and ground to reduce noise at the voltage regulator 54 input. A Zener diode 60 has its cathode connected to the input and its anode connected to ground to protect the voltage regulator 54. The voltage regulator 54 supplies 10 volts (+10V) for use by the charge rate controller 26 circuitry. A resistor voltage divider formed by resistors 62 and 64 connected between +10V and ground establishes a feedback path to the voltage regulator 54 to determine and maintain the output voltage at +10V. A capacitor 66 is connected from the +10V line to the junction of the resistors 62 and 64 for feedback loop compensation. A capacitor 68 is connected between +10V and ground to act as the main 10V power supply filter capacitor. A diode 70 has its anode connected to the output of the voltage regulator 54 and its cathode connected to the collector of the pass transistor 52 for reverse voltage protection. The voltage regulator 54 further includes an inverted error output which, when low, indicates either a power-up condition or a low output voltage. The error output is pulled up to the +10V level by a resistor 140 and is coupled to ground by a noise filtering capacitor 142.

A current limiter 72 controls the trickle current during slow or trickle charge periods. Preferably, the current limiter 72 includes a conventional low power adjustable voltage regulator 73 such as an LM317 from National Semiconductor. The voltage input terminal of the current limiter 72, and the regulator 73, is connected to the VBATTNEG input of the controller 26. The maximum amount of current, or the current limit, is determined by a resistor 74 connected between the adjustment and voltage output terminals of the regulator 73. The resistor 74 value is chosen to limit the current to the proper amount of trickle current for the Ni-Cad battery 28 according to the manufacturer's recommendations and conventional limits. A charge current sense resistor 76 is connected between the adjustment terminal of the regulator 73 and ground. A diode 146 has its cathode connected to the VBATTNEG terminal and its anode connected to ground to allow current flow when the batteries are discharging in order to bypass the sense resistor 76 during short circuit discharge conditions. Discharge occurs in the preferred embodiment only when the ac adaptor 20 is off and the computer system is battery powered.

A pair of parallel n-channel enhancement FET power transistors 78 and 80 have their drains and sources connected from the VBATTNEG input to the adjustment terminal of regulator 73, thus paralleling the current limiter 72. The voltage at the drain is referred to as $V_d$ and the voltage at the source is referred to as $V_s$. Filtering capacitors 102 and 112 are connected, respectively, from the drains and the sources of the transistors 78 and 80 to ground. A signal referred to as $V_g$ is provided to the gates of the transistors 78 and 80. In this configuration, when the $V_g$ signal level is low, the transistors 78 and 80 are turned off so that the effective resistance between the FET drain voltage $V_d$ and source voltage $V_s$ is extremely high. The FET transistors consequently appear as open circuits to the current limiter 72. Therefore, all the current charging the Ni-Cad battery 28 must pass through the current limiter 72. Because the current limiter 72 is set to limit at the trickle charge rate, this $V_g$ signal off condition thus defines the trickle or slow charge mode. When a proper high level $V_g$ signal is applied, both FET transistors 78 and 80 turn on, which effectively bypasses or shorts out the current limiter 72. This bypassing allows the ac adaptor 20 to charge the Ni-Cad battery 28 at a fast rate, up to the current or power limits of the ac adaptor 20, or allow a low voltage drop during battery discharge conditions. As noted, the current or power limit of the ac adaptor 20 is set such that even at full delivery the charge rate of the Ni-Cad battery 28 is within acceptable limits. Thus, proper control of the $V_g$ signal level sets trickle or fast charge mode.

A temperature sensor 82 monitors the temperature of the Ni-Cad battery 28. The temperature sensor 82 is preferably in good thermal contact with the Ni-Cad battery 28 to allow the thermal sensor 82 to accurately determine the temperature of the cells to prevent damage. For this reason the controller 26 is preferably confined in the same physical unit as the Ni-Cad battery 28. The temperature sensor 82 receives power from the +10V developed by the regulator 54 and provides an output signal referred to as Vo. The Value of the signal Vo is proportional to the temperature to allow comparison for protection and control purposes. The Vo signal is connected to ground by a resistor 84. A resistor 86 is connected between the Vo signal and a signal referred to as T. The T signal is connected to ground by capacitor 88. Thus the T signal is a filtered version of the Vo signal.

A control module 90 monitors the Ni-Cad battery 28 voltage, charge rate, and temperature and outputs the $V_g$ signal to control the FET transistors 78 and 80. The control module 90 receives the $V_d$ and $V_s$ levels through series protection resistors 100 and 110, respectively. Similarly, the control module 90 provides the $V_g$ signal through a series resistor 92. A RESET- input of the control module 90 is connected to the inverted error output of the voltage regulator 54, which is low during startup conditions or other low output voltage conditions. Capacitors 134 and 136 are connected between the TCAP2 and TCAP1 inputs of the control module 90 and ground, while a resistor 132 is connected between the TRES input and ground, with a capacitor 138 connected between the TRES input and +10V. The capacitors 134 and 136 and resistor 132 are used as the timing components for an oscillator in the control module 90. A power supply decoupling capacitor 144 is connected between +10V and ground for removing noise at the control module 90. The control module 90 also receives the T signal to allow temperature monitoring.

A series of four reference voltages are developed for use by the control module 90 in various comparisons. The inputs are referred to as VREF4, VREF3, VREF2, and VREF1. Each of these inputs is connected to ground by a capacitor 130, 124, 128 or 126, respectively, for noise control purposes. The actual voltage levels are developed by the series combinations of resistors 122, 120, 118, 116 and 114, which are connected between +10V and ground. The junction between the resistors 122 and 120 is connected to the VREF4 input, while the junction between the resistors 120 and 118 is connected to the VREF2 input. The junction of the resistors 118 and 116 is connected to the VREF1 input, while the remaining junction between the resistors 116 and 114 is connected to the VREF3 input.

The final inputs to the control module 90, besides power and ground, are the VBATT/5 and the VD/5 inputs. These signals are used to determine the actual voltage of the Ni-Cad battery 28 to prevent an overcurrent condition when the voltage is too low or reversed and only trickle charging is proper. The VBATT/5 input is connected to the junction of two series resistors 94 and 96 which are connected between the collector of transistor 52 and ground. A capacitor 98 parallels the resistor 96 for noise filtering. The VD/5 input is connected to the junction of two series resistors 104 and 106 which are connected between $V_d$ and ground. A noise capacitor 108 parallels the resistor 106.

Figure 3:
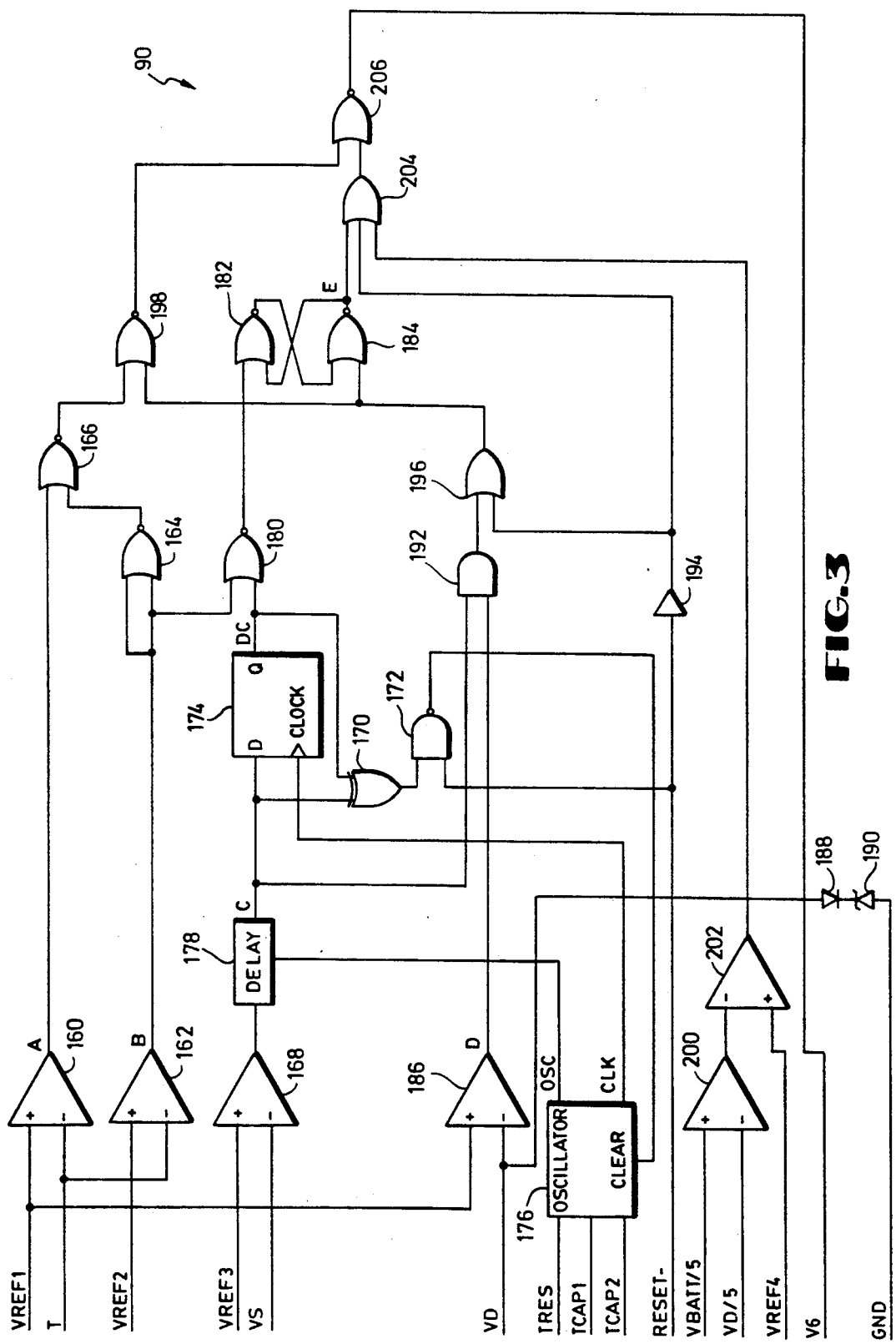
FIG. 3 is a schematic diagram showing the logic of the status and control block of FIG. 2.

The logic of the control module 90 is shown in FIG. 3. A comparator 160 compares the temperature sense voltage T with the reference voltage VREF1. The level of voltage VREF1 preferably corresponds to a temperature of 10° celsius (C) so that the output signal A is asserted low when the battery temperature rises above 10° C. and is asserted high when the temperature falls below 10° C.

A comparator 162 compares the temperature sense voltage T with the reference voltage VREF2. The level of voltage VREF2 preferably corresponds to a temperature of 40° C., so that the output signal B is asserted high when the battery temperature is below 40° C. and asserted low if the battery temperature rises above 40° C. A NOR gate 164 negates the signal B. The A signal and the output of the NOR gate 164 are the inputs to a two input NOR gate 166. The NOR gate 166 thus asserts its output high when the battery temperature is between 10° C. and 40° C., which corresponds to the allowable temperature range for fast charging the Ni-Cad battery 28 in the preferred embodiment.

A comparator 168 compares the voltage VS, input from the $V_s$ signal, with the reference voltage VREF3 and asserts its output low when the level of the voltage VS is greater than the reference voltage VREF3. As previously noted, the voltage $V_s$ is proportional to the charge current flowing through the sense resistor 76. Thus the voltage VS will be a low level during trickle charge, will be negative during discharge and will be a higher level during fast charge. If the output of the comparator 168 is asserted low, this implies that the battery is being charged at the fast rate. A delay device 178 is connected to the output of the comparator 168 and outputs a signal referred to as C. The C signal is thus a delayed version of the output of the comparator 168. The delay device 178 receives a signal referred to as OSC from an oscillator 176. The OSC signal is used to produce the delay. The C signal is provided as one input to a two input XOR gate 170 and to the D input of a D-type flip-flop 174. The second input to the XOR gate 170 is provided by the Q output of the flip-flop 174, a signal referred to as DC. The flip-flop 174 is used to provide a delay for the sense voltage comparison to prevent power supply transients, such as those developed by turning on the computer system or specific components, from falsely indicating a low current state. The output of the XOR gate 170 is provided to one input of a two input NAND gate 172. The second input of the NAND gate 172 is provided by the RESET- signal, which is the inverted error signal from the voltage regulator 54. The output of the NAND gate 172 is provided to the clear input of the oscillator 176. The clock input of the flip-flop 174 is connected to the CLK signal output of the oscillator 176.

The time of delay between the flip-flop 174 input signal C and the output signal DC is determined by the oscillator 176, the external capacitor 136 connected to the TCAP1 input and the external resistor 132 connected to the TRES input of the oscillator 176. If signal C is equal to signal DC, the XOR gate 170 will assert its output low which will cause the NAND gate 172 to assert its output high, and thus the clear input to the oscillator 176 will be high. This causes the oscillator 176 to short the input capacitor 136 to ground. The oscillator 176 output signal CLK, determined by the voltage across capacitor 136 is, therefore, set low. If signal C then changes so that it is not equal to signal DC, the XOR gate 170 asserts its output high, and assuming the RESET- signal is high also, the NAND gate 172 asserts its signal low which also sets the clear input of the oscillator 176 low. The oscillator 176 then charges capacitor 136 through resistor 132. The time the voltage across capacitor 136 takes to rise from low to high depends on the values of resistor 132 and capacitor 136, and the time should preferably range from one to six seconds. The CLK output signal of oscillator 176 will thus rise, causing the clock input of the flip-flop 174 to rise accordingly. When the clock input of the flip-flop 174 reaches a high level, the flip-flop 174 will transfer its C input to the DC output, causing the signals to be equal. The XOR gate 170 will then assert its output low, causing the NAND gate 172 to assert its output high, which causes the oscillator 176 to short capacitor 136 to ground. The output signal CLK will, therefore, go low, causing the flip-flop 174 clock input to go low also. Therefore, the signal C is transferred to signal DC after a delay of one to six seconds.

The oscillator 176 generates a free running timing clock referred to as the OSC signal, which is output to the delay device 178. An external capacitor 134 is connected between the TCAP2 input of the oscillator 176 and ground. The frequency of the OSC signal is determined by the resistor 132 and the capacitor 134. The resistor 132 and the capacitor 134 should preferably be chosen so that the frequency of signal OSC is between 200 hertz and 2 kilohertz.

A two input NOR gate 180 receives as inputs the high temperature signal B and the delayed fast charge signal DC output by the flip-flop 174. Thus the output of the NOR gate 180 is high when the battery temperature is above 40° C. and the battery 28 is being charged in the fast mode. This is an indication that the battery 28 is fully charged and the charge mode should change from fast to trickle. A pair of two input NOR gates 182 and 184 are configured as an S-R latch. The output of the NOR gate 180 is provided as one input to the NOR gate 182, while the other input is connected to the output of the NOR gate 184. The output of the NOR gate 184 is referred to as the E signal. The output Öf the NOR gate 182 is connected to one input of the NOR gate 184. The second input is provided by the output of a two input OR gate 196. If the output of NOR gate 180 goes high, indicating time to enter trickle charge mode, the S-R latch formed by the NOR gates 182 and 184 is set and the E signal goes high, the output of the OR gate 196 being low during charging operations.

A comparator 186 compares the FET drain voltage $V_d$, input as VD, with the reference voltage VREF1. The output signal referred to as D is asserted low when the voltage VD is greater than the reference voltage VREF1, which implies that the Ni-Cad battery 28 is being charged in slow mode. If the FET transistors 78 and 80 are turned on, or the battery 28 is discharging, the level of the voltage VD falls below the level of the reference voltage VREF1 and the D signal is set high. A diode 188 and a Zener diode 190 are connected between the VD input and ground to protect the control module 90 by clamping the VD input to a suitable level if a deeply discharged Ni-Cad battery 28 is placed between VIN and VBATTNEG.

The C and D signals are the two inputs to a two input AND gate 192. The output of the AND gate 192 is high, therefore, if the battery 28 is not being charged at all or is being discharged. The output of the AND gate 192 is provided as one input to the OR gate 196. The second input to the OR gate 196 is provided by the output of an inverter 194. The RESET- signal is connected to the input of the inverter 194. Thus the output of the OR gate 196 goes high if a reset is indicated or if the battery 28 is not being charged in the fast or trickle modes. Because the ac adaptor 20 preferably always provides sufficient power to charge the battery 28 when active, this not fast and not trickle mode indicates battery powered operation, so that discharge is occurring and it may be appropriate to try fast charging the battery 28 when the ac adaptor 20 is next active and is appropriate to turn on the transistors 78 and 80 to allow a low voltage drop during discharge. Thus the high level from the OR gate 196 clears the S-R latch formed by the NOR gates 182 and 184.

A two input NOR gate 198 receives as inputs the outputs of the NOR gate 166 and the OR gate 196. The output of the NOR gate 198 indicates, when low, that the battery temperature is acceptable for fast charging or the battery 28 is not charging.

A difference amplifier 200 subtracts the divided drain voltage VD/5 from the divided battery voltage VBATT/5. The difference between the VBATT/5 and VD/5 voltages represents the battery voltage divided by five. This difference voltage is then compared to the reference voltage VREF4 by a comparator 202. The output of the comparator 20 is set high if the difference between the VBATT/5 and VD/5 voltages is less then voltage reference VREF4, which means that the battery voltage is too low. This prevents a deeply discharged battery 28 from shutting down the computer system, by utilizing all the power from the ac adaptor 20, with the computer 24 then seeing a low voltage condition and thus possibly failing. By sensing this low voltage battery 28, trickle charge mode can be employed until the battery 28 is to a level when fast charge can be employed without potentially interfering with computer 24 operations.

A three input OR gate 204 receives as inputs the outputs of the inverter 194 and the comparator 202 and the E signal. Thus the output of the OR gate 204 goes high if any of the following conditions is met: 1) the battery 28 has completed fast charging; 2) the RESET- signal goes low; or 3) the battery voltage is too low.

The output of the OR gate 204 is one input to a two input NOR gate 206. The second input is connected to the output of the NOR gate 198. The output of the NOR gate 206 is the $V_g$ signal, output to the FET power transistors 78 and 80 as the $V_g$ signal, which controls activation of the FET power transistor 78 and 80. Therefore, the VG signal is high, indicating fast charge or discharge mode, if signal E is low, the battery temperature is in the proper range, the battery voltage is not too low and the voltage regulator 54 is not indicating an error condition.

An example of the charge cycle would facilitate a better understanding of the operation of the Ni-Cad battery charge rate controller 26. The ac adaptor 20 provides power to computer 24. Computer 24 then asserts signal STANDBY low which turns on the PNP pass transistor 52, allowing ac adaptor 20 to provide power to the Ni-Cad battery charge rate controller 26. When power is first applied, the voltage regulator 54 asserts output ERROR- low, which keeps the RESET- input to the control module 90 low. The output of inverter 194 is thus held high which keeps the output of OR gate 204 high and the output of NOR gate 206 low. The output voltage VG is, therefore, held low during this power-up interim. The output of the OR gate 196 is high, which causes the NOR gate 184 to set its output, signal E, low.

The output voltage of the voltage regulator 54 will eventually stabilize to be +10 volts, and the voltage regulator 54 will then assert its output ERROR-high. The RESET- input of the control module 90 is thus held high, forcing the inverter 194 to assert its output low. If the Ni-Cad battery voltage is high enough, then voltage VBATT/5 minus voltage VD/5 will be greater than reference voltage VREF4 and the comparator 202 will assert its output low. The output of the OR gate 204 will thus be low. If the temperature of the Ni-Cad battery 28 is greater than 10° C. but less than 40° C, then signal A will be low and signal B will be high. The output of the NOR gate 166 will, therefore, be high, causing the output of the NOR gate 198 to be low. All of these conditions allow the output of NOR gate 206 to be high which means that the output voltage VG is high, and fast charging can occur.

In the case where the battery 28 is deeply discharged, if the computer 24 is turned on and the Ni-Cad battery charge rate controller 26 allows fast charging to occur, most or all of the power supplied by the ac adaptor 20 would be diverted to charge the battery 28, leaving no power for computer 24. The charge rate controller 26 prevents this situation from occurring. The voltage across the battery 28 will be low if deeply discharged, causing voltage level VBATTNEG and voltage $V_d$ to be high. The VD input of control module 90 will also be high but is clamped to six volts by diode 188 and Zener diode 190. The output voltage of the difference amplifier 200 will be lower than voltage reference VREF4 since VD/5 subtracted from VBATT/5 will be a low voltage. The comparator 202 will thus assert itself high and this will force the output VG low, thus disabling fast charge. The Ni-Cad battery 28 will thus be trickle charged until its voltage rises to an acceptable level for fast charging. Once the voltage of battery 28 does reach this level, the comparator 202 will set its output low, allowing fast charge to occur.

If voltage VG is high, the FET power transistor 78 and 80 are turned on, causing voltage VD to be lower than the voltage reference VREF1. The output signal D of comparator 186 will be asserted high. If the battery 28 is being fast charged, then voltage VS will be greater than the voltage reference VREF3 and the output of the comparator 168 will be asserted low. The delay device 178 will, therefore, assert signal C low, and after a 1-6 second delay, the flip-flop 174 will assert signal DC low to match signal C. While fast charging, the battery 28 temperature will begin to rise. As long as the battery temperature is below 40° C., signal B is asserted high. As soon as the battery temperature becomes greater than 40° C., voltage signal T rises above voltage reference VREF2 and the comparator 162 asserts signal B low. The OR gate 180 then asserts its output high which causes the NOR gate 182 to assert its output low, thus causing the S-R latch formed by NOR gates 182 and 184 to assert the signal E high. When signal E goes high, the output voltage VG goes low and this disables the fast charge mode.

If the battery 28 is above 40° C. and the ac adaptor 20 is connected, the signal VG is low. The signal VG stays low until the temperature is below 40° C., at which time the output of the NOR gate 166 goes high, causing the output of the NOR gate 198 to go low, allowing the VG signal to go high if the output of the OR gate 204 is low. Thus, when an ac adapter 20 is connected to an over-temperature battery 28, the battery 28 is trickle charged until its temperature drops within the allowable fast charging temperature range, at which time fast charging will commence.

The delay device 178 prevents a race condition between signal C and D when changing modes from fast charge to slow charge. Signal D is high and signal C is low during the fast charge. Forcing voltage VG low turns FET transistors 78 and 80 off, which will cause the voltage $V_d$ and VD to go high and the voltage $V_s$ and VS to go low. This eventually causes signal D to go high and C to go low. If signal C were allowed to go high before signal D went low, the AND gate 192 would assert its output high temporarily, causing OR gate 196 to assert its output high, forcing NOR gate 184 output signal E low again, resetting the S-R latch. When signal E goes low, the output voltage VG would again be asserted high. When signal D finally goes low, the NOR gate 198 would assert its output high again causing the output voltage VG to go low. The voltage VG would thus oscillate back and fourth until the entire system stabilized. This race condition is prevented by delaying signal C with delay device 178, thereby allowing signal D to go low at the input of the AND gate 192 before signal C rises. The delay device 178 provides the sufficient delay to prevent this race. The output of the AND gate 192 thus stays low which prevents the signal E from being reset from high to low, which, in turn, prevents output VG from oscillating.

The Ni-Cad battery 28 is now in trickle mode until signal E is set low again, assuming the battery 28 voltage does not drop too low and the RESET- input is not pulled low. The Ni-Cad battery charge rate controller 26 will remain in trickle mode until either the RESET- signal is set low or if the battery 28 is discharged. If the battery 28 and the controller 26 were removed from the computer 24 or if the computer 24 asserted signal STANDBY high and then low again, the resulting power-down sequence would cause the voltage regulator 54 to set its output signal ERROR- low, thus pulling signal RESET- low. In the preferred embodiment, when ac power 22 is available the ac adaptor 20 is able to provide sufficient power to the computer 24 under all conditions, so that the Ni-Cad battery 28 will not be discharged.

When ac power 22 is not available, the Ni-Cad battery 28 provides power to the computer 24. When the computer 24 is not in low power mode, the controller 26 is active. The output of the AND gate 192 is high, indicating discharge mode, so that the signal E is low. Assuming that the battery voltage is not too low and no error conditions are occurring, the VG signal will be high, enabling the transistors 78 and 80. Thus the transistors 78 and 80 are turned on during discharge to provide a low resistance and, therefore, a low voltage drop path.

When the ac adaptor 20 is disconnected from the ac power source 22, the computer 24 asserts signal STANDBY low until system inactivity indicates that the low power mode should be entered. When the computer 24 enters low power mode the STANDBY signal is set high, which disables the Ni-Cad battery charge rate controller 26 circuitry so that it will not consume power.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

I claim:

1. A circuit for charging a battery, comprising:
means for monitoring battery temperature;
means for monitoring battery voltage;
means for monitoring battery charge current;
constant trickle current limit means connected in the charge path of the battery;
a transistor having an input terminal, an output terminal and a control terminal, said input and output terminals connected to said constant trickle current limit means so as to be in parallel; and
mans connected to said transistor control terminal, said battery temperature monitoring means, said battery voltage monitoring means and said battery charge current monitoring means for providing a signal to said transistor control terminal to turn on said transistor if the battery has been discharged, the battery temperature is within allowable limits, the battery is charging and the battery voltage is above a predetermined level and to turn off said transistor if said transistor has been turned on and the battery temperature exceeds a predetermined level.

2. The circuit of claim 1, wherein the battery is a Nickel-Cadmium battery.

3. The circuit of claim 1, wherein said means for monitoring the battery temperature includes means for converting the battery temperature into a voltage signal having a level indicative of the battery temperature.

4. The circuit of claim 3, wherein said means for converting the battery temperature into said voltage signal comprises a temperature sensor in good thermal contact with the battery, said temperature sensor having an output terminal which outputs said voltage signal.

5. The circuit of claim 3, further comprising:
means for producing a plurality of reference voltages, and
wherein said transistor control terminal signal providing means includes
means for comparing said voltage signal from said battery temperature to voltage conversion means with a first reference voltage, wherein said first reference voltage has a level that corresponds to a low battery temperature, for providing a signal indicative of low temperature of the battery;
means for comparing said voltage signal from said battery temperature to voltage conversion means with a second reference voltage, wherein said second reference voltage has a level that corresponds to a high battery temperature, for providing a signal indicative of high temperature of the battery; and
means connected to said low battery temperature signal and said high battery temperature signal, for providing a signal indicative of allowable temperature range between said low and high battery temperatures.

6. The circuit of claim 5, wherein said low battery temperature comparing means comprises a first comparator having two input terminals and an output terminal wherein said first reference voltage is connected to one of said two input terminals and said voltage signal is connected to the other of said two terminals,
wherein said high battery temperature comparing means comprises a second comparator having two input terminals and an output terminal wherein said second reference voltage is connected to one of said two input terminals and said voltage signal is connected to the other of said two input terminals; and
wherein said allowable temperature range means comprises a gate having two input terminals and one output terminal, said output terminal of said first comparator connected to one input terminal of said gate, said output terminal of said second comparator connected to the other input terminal of said gate, and said output terminal of said gate providing said signal indicative of said allowable temperature range.

7. The circuit of claim 5, wherein said transistor control terminal signal providing means further includes means for sensing an error condition and turning off said transistor during said error condition.

8. The circuit of claim 5, wherein said transistor control terminal signal providing means further includes means for keeping said transistor turned off after said transistor has been turned on and the battery temperature has exceeded said predetermined limit until an error condition occurs or the battery is discharged.

9. The circuit of claim 1, wherein said means for monitoring battery charge current includes a resistor connected in series in the battery charge path and means for detecting the voltage across said resistor.

10. The circuit of claim 9, wherein said resistor is connected between said constant trickle current limit means and ground.

11. The circuit of claim 9, wherein said battery charge current monitoring means further includes means for producing a reference voltage and means for comparing said voltage across said resistor with a reference voltage wherein said reference voltage corresponds to a predetermined current indicative of a fast charge rate and for providing a signal indicative of fast charge.

12. The circuit of claim 11, wherein said comparing means comprises a comparator with two input terminals and an output terminal, said reference voltage connected to one of said two input terminals and said resistor voltage connected to the other of said two input terminals, said output terminal providing a signal indicative of fast charge.

13. The circuit of claim 1, wherein said constant trickle current limit means comprises a resistor and a voltage regulator having an input terminal, an output terminal and an adjust terminal, said resistor connected between said adjust terminal and said output terminal, and said input terminal and said adjust terminal coupled in series in the battery charge path.

14. The circuit of claim 13, wherein said regulator input terminal is connected to the negative terminal of the battery and said regulator adjust terminal is connected to said means for monitoring battery charge current.

15. The circuit of claim 1, wherein said transistor is a field effect transistor having a drain terminal as said input terminal, a source terminal as said output terminal, and a gate terminal as said control terminal.

16. The circuit of claim 1, wherein said transistor is a field effect transistor having a drain terminal as said input terminal, a source terminal as said output terminal, and a gate terminal as said control terminal.

17. The circuit of claim 1, wherein said battery voltage monitoring means includes means for developing a reference voltage and means for comparing the battery voltage with said reference voltage, wherein said reference voltage corresponds to a battery voltage below a predetermined allowable level, and for providing a signal indicative of low voltage of the battery.

18. The circuit of claim 17, wherein said battery voltage monitoring means further includes means for dividing the battery voltage and wherein said comparing means comprises a comparator with two input terminals and one output terminal, said reference voltage connected to one of said two input terminals and said divided battery voltage is connected to the other of said two input terminals, and said output terminal providing said low voltage signal.

19. A system for charging a battery, comprising:
means for providing power to charge a battery; and
a single physical unit removably connected to said power providing means, comprising:
a battery, and
a charge rate controller connected to the battery, comprising:
means for monitoring the battery temperature,
means for monitoring the battery voltage,
means for monitoring the battery charge current,
current limit means connected in the charge path of the battery,
a transistor having an input terminal, an output terminal and a control terminal, said input and output terminals connected to said current limit means so as to be in parallel, and
means connected to said transistor control; terminal, said battery temperature monitoring means, said battery voltage monitoring means and said battery charge current monitoring means for providing a signal to said transistor control terminal to turn on said transistor if the battery has been discharged, the battery temperature is within allowable limits, the battery is charging said the battery voltage is above a predetermined level and to turn off said transistor if said transistor has been turned on and the battery temperature exceeds a predetermined level.

20. The system of claim 19, wherein said power providing means includes a positive terminal and a negative terminal and said single physical unit includes a positive terminal and a negative terminal, said single physical unit positive and negative terminals being removably connected to said power providing means positive and negative terminals, respectively.

21. The system of claim 20, wherein the battery includes a positive terminal connected to said single physical unit positive terminal and a negative terminal, and wherein said charge rate controller includes a positive terminal connected to said single physical unit positive terminal, a negative terminal connected to said single physical unit negative terminal, and a charge path terminal connected to said battery negative terminal of the battery.

22. The circuit of claim 19, wherein the battery is a Nickel-Cadmium battery.

23. The circuit of claim 19, wherein said means for monitoring the battery temperature comprises a temperature sensor in good thermal contact with the battery, said temperature sensor having an output terminal which outputs a voltage signal having a level indicative of the battery temperature.

24. The circuit of claim 23, further comprising:
means for producing a plurality of reference voltages, and
wherein said transistor control terminal signal providing means includes:
means for comparing said voltage signal from said temperature sensor with a first reference voltage, wherein said first reference voltage has a level that corresponds to a low battery temperature, for providing a signal indicative of low temperature of the battery;
means for comparing said voltage signal from said temperature sensor with a second reference voltage, wherein said second reference voltage has a level that corresponds to a high battery temperature, for providing a signal indicative of high temperature of the battery; and
means connected to said low battery temperature signal and said high battery temperature signal, for providing a signal indicative of allowable temperature range between said low and high battery temperatures.

25. The circuit of claim 24, wherein said low battery temperature comparing means comprises a first comparator having two input terminals and an output terminal wherein said first reference voltage is connected to one of said two input terminals and said voltage signal is connected to the other of said two terminals,
wherein said high battery temperature comparing means comprises a second comparator having two input terminals and an output terminal wherein said second reference voltage is connected to one of said two input terminals and said voltage signal is connected to the other of said two input terminals; and
wherein said allowable temperature range means comprises a gate having two input terminals and one output terminal, said output terminal of said first comparator connected to one input terminal of said gate, said output terminal of said second comparator connected to the other input terminal of said gate, and said output terminal of said gate providing said signal indicative of said allowable temperature range.

26. The circuit of claim 24, wherein said transistor control terminal signal providing means further includes means for sensing an error condition and turning off said transistor during said error condition.

27. The circuit of claim 24, wherein said transistor control terminal signal providing means further includes means for keeping said transistor turned off after said transistor has been turned on and the battery temperature has exceeded said predetermined limit until an error condition occurs or the battery is discharged.

28. The circuit of claim 20, wherein said means for monitoring battery charge current includes a resistor connected n series in the battery charge path and means for detecting the voltage across said resistor.

29. The circuit of claim 28, wherein said resistor is connected between said current limit means and said single physical unit negative terminal.

30. The circuit of claim 19, wherein said battery charge current monitoring means further includes means for producing a reference voltage and means for comparing said voltage across said resistor with a reference voltage wherein said reference voltage corresponds to a predetermined current indicative of a fast charge rate and for providing a signal indicative of fast charge.

31. The circuit of claim 30, wherein said comparing means comprises a comparator with two input terminals and an output terminal, said reference voltage connected to one of said two input terminals and said resistor voltage connected to the other of said two input terminals, said output terminal providing a signal indicative of fast charge.

32. The circuit of claim 19, wherein said current limit means comprises a resistor and a voltage regulator having an input terminal, an output terminal and an adjust terminal, said resistor connected between said adjust terminal and said output terminal, and said input terminal and said adjust terminal coupled in series in the battery charge path.

33. The circuit of claim 32, wherein said regulator input terminal is connected to the negative terminal o the battery and said regulator adjust terminal is connected to said means for monitoring battery charge current.

34. The circuit of claim 19, wherein said transistor is a field effect transistor having a drain terminal as said input terminal, a source terminal as said output terminal, and a gate terminal as sad control terminal.

35. The circuit of claim 19, wherein said transistor comprises two field effect transistors, each having a drain terminal as said input terminal, a source terminal as said output terminal, and a gate terminal as said control terminal, such that said FET's are connected in parallel.

36. The circuit of claim 19, wherein said battery voltage monitoring means includes means for developing a reference voltage and means for comparing the battery voltage with said reference voltage, wherein said reference voltage corresponds to a battery voltage below a predetermined allowable level, and for providing a signal indicative of low voltage of the battery.

* * * * *

UNITED STATES PATENT AND TRADEMARK OFFICE
CERTIFICATE OF CORRECTION

PATENT NO. : 5,136,231
DATED : August 4, 1992
INVENTOR(S) : Richard A. Faulk

It is certified that error appears in the above-identified patent and that said Letters Patent is hereby corrected as shown below:

In Col. 10, Line 47, please replace "mans" with -- means --.
In Col. 12, Lines 28-31, please cancel claim 16 and replace it as follows:

The circuit of claim 1, wherein said transistor comprises two field effect transistors, each having a drain terminal as said input terminal, a source terminal as said output terminal, and a gate terminal as said control terminal, such that said FET's are connected in parallel. --

In Col. 12, Line 64, please delete the ";" after the word "control".
In Col. 14, Line 19, please replace "n" with -- in --.
In Col. 14, Line 47, please replace "o" with -- of --.
In Col. 14, Line 54, please replace "sad" with -- said --.

Signed and Sealed this

Twenty-fourth Day of August, 1993

Attest:

BRUCE LEHMAN

Attesting Officer

Commissioner of Patents and Trademarks